Figure 1:
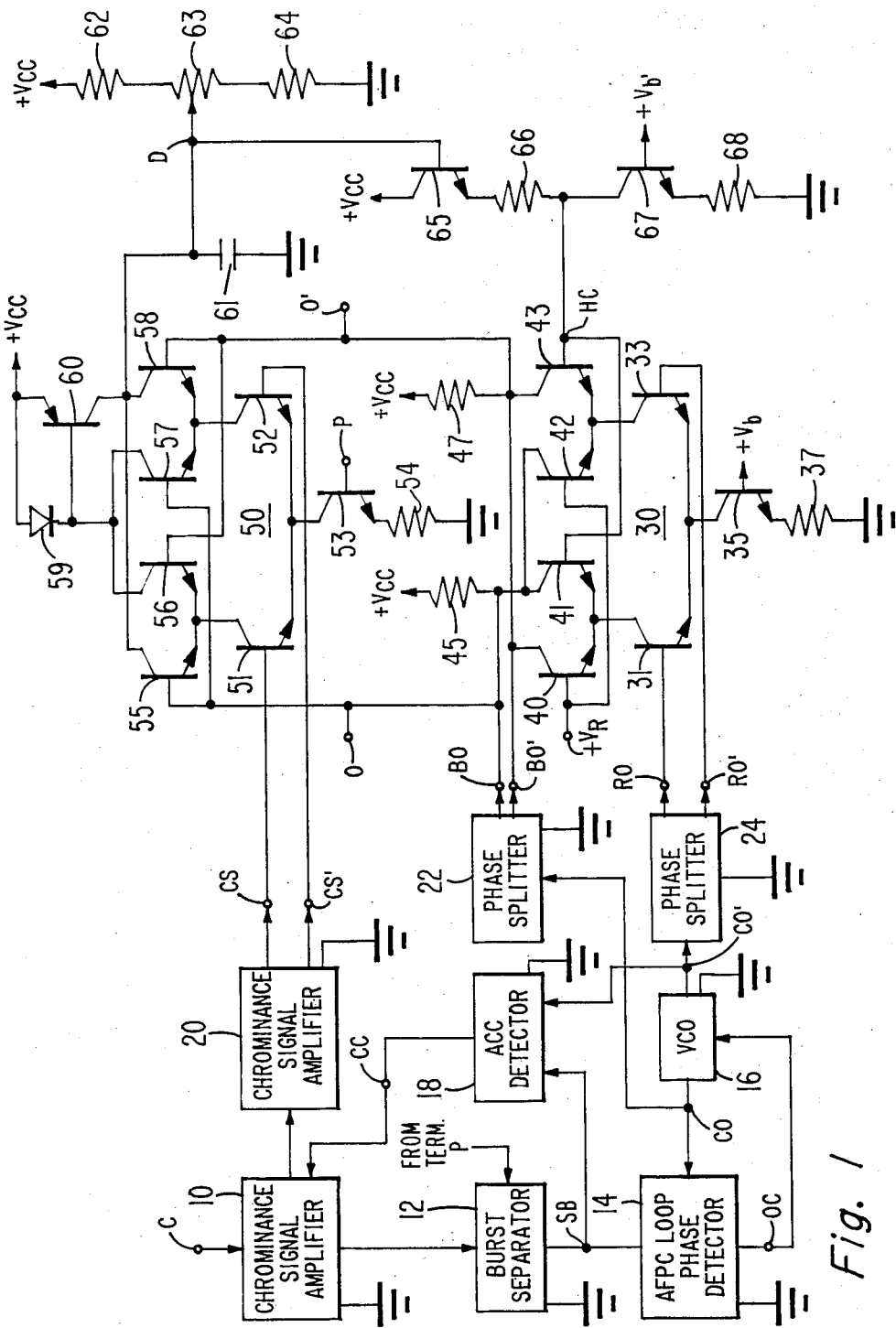

United States Patent [19]

Harwood

[11] Patent Number: 4,628,346

[45] Date of Patent: Dec. 9, 1986

[54] ELECTRICAL SERVO SYSTEM HAVING MANUAL OVERRIDE AFFECTING SERVO LOOP GAIN

[75] Inventor: Leopold A. Harwood, Bridgewater, N.J.

[73] Assignee: RCA Corporation, Princeton, N.J.

[21] Appl. No.: 605,250

[22] Filed: Apr. 30, 1984

[51] Int. Cl.⁴ .............................................. H04N 9/64
[52] U.S. Cl. ..................................... 358/28; 358/21 R
[58] Field of Search ....................... 358/28, 21 R, 21 V

[56] References Cited

U.S. PATENT DOCUMENTS

| | | | |
|---|---|---|---|
| 4,096,515 | 6/1978 | Brown, Jr. | 358/28 |
| 4,183,048 | 1/1980 | Isono | 358/28 |
| 4,533,939 | 8/1985 | Cense | 358/28 |

OTHER PUBLICATIONS

Copending U.S. Patent Application of L. A. Harwood, filed Mar. 28, 1984, and entitled "Chrominance Processor Control System".
Bang & Olufsen service manual for Beovision 5100, 7100, 8100 Color TV Receivers (bearing date of 12-82) pp. 4 (and cover page).
Portion of Schematic for Blaupunkt FM-120 Color TV Receiver (Circa 1980-1).

Primary Examiner—Michael A. Masinick
Attorney, Agent, or Firm—Eugene M. Whitacre; Paul J. Rasmussen; William H. Meagher

[57] ABSTRACT

In a color television receiver, color reference oscillations, developed by a VCO under AFPC loop control, are supplied to a variable phase shifter. A phase detector, responsive to the phase shifter output and to the burst component of received color television signals, develops a control voltage indicative of the phase relationship therebetween at its output terminal. Application of the control voltage to a control voltage input terminal of the phase shifter completes a servo control loop for maintaining the phase of the shifter's output in a predetermined relationship with the burst phase. A manual hue control potentiometer has an adjustable tap connected to the phase detector output terminal in such manner that tap adjustment alters voltage at control voltage input terminal while concomitantly altering servo loop gain.

4 Claims, 2 Drawing Figures

ELECTRICAL SERVO SYSTEM HAVING MANUAL OVERRIDE AFFECTING SERVO LOOP GAIN

The present invention relates generally to electrical servo systems, and particularly to electrical servo systems of the type incorporating a manual override facility.

In a form of electrical servo system of particular interest herein, a source of electrical signals is associated with means for processing said electrical signals. The signal processing means has a control voltage input terminal, and provides a processed signal output having a parameter subject to variation in accordance with the voltage applied to the control voltage input terminal. Means are provided for forming a servo control loop for opposing departures of said parameter of the processed signal output from a predetermined relationship with a reference parameter. The servo control loop forming means includes (1) a detector, responsive to said processed signal output and to a reference signal indicative of said reference parameter, for developing a control voltage indicative of the magnitude and sense of such departures; and (2) means for utilizing said control voltage to alter the voltage at the control voltage input terminal of the signal processing means in a sense tending to reduce the departure.

In equipment utilizing a servo system of the above-described type, it is often desired to associate some form of manual override with the servo system; i.e., to provide a facility permitting a manual adjustment to alter the value of the controllable parameter of the processed signal output from that otherwise maintained by the servo system. A difficulty associated with straight forward attempts to intrude such a manual override is the tendency of the servo system itself to oppose the parameter change introduced by the manual adjustment, with a consequence of severely limiting the range of parameter change that can be affected by the manual adjustment. Examples of prior art approaches, using gating techniques that permit such difficulty to be overcome in particular circumstances, appear in U.S. Pat. Nos. 2,921,122-Macovski, and in 4,096,515-Brown, et al.

In accordance with the principles of the present invention, introduction of a manual override to a servo system of the previously described type is achieved through the use of apparatus comprising: a DC voltage source; manually adjustable means for deriving from said source a DC voltage of a magnitude adjustable within a predetermined range of magnitudes; and means for rendering the voltage appearing at the control voltage input terminal of the signal processing means responsive to the adjustable magnitude of said derived DC voltage, while concomitantly rendering the gain of the servo control loop responsive to the adjustment condition of said manually adjustable means. Desirably, the gain of the servo control loop may be rendered responsive to the adjustment condition of the manually adjustable means in such manner that said servo control loop exhibits a gain of maximum value in consonance with the derivation by said manually adjustable means of a DC voltage of a magnitude at the middle of said range of magnitudes, with said loop gain exhibiting a decline from said maximum value for adjustment conditions resulting in a deviation of either sense from said DC voltage range middle, and the degree of said decline depending upon the magnitude of said deviation.

In an illustrative application of the present invention to use in a color television receiver for hue control purposes, the signal source of the aforesaid servo system comprises the receiver's color reference oscillator, the signal processing means thereof comprises a variable phase shifter for reference oscillations developed by said oscillator, the servo loop's detector functions as a phase detector, and the controlled parameter is the phase of the reference oscillation output of the variable phase shifter. In such an application of the present invention, the manually adjustable means of the above-described system advantageously serves as a manual hue control for the receiver.

Illustratively, in the aforesaid color TV receiver application of the present invention, the manually adjustable means comprises a potentiometer having fixed end terminals across which the DC voltage source is connected, and an adjustable tap connected to an output terminal of the loop's phase detector in such manner that the magnitude of the phase detector's load impedance may be significantly affected by the position of the adjustable tap. A non-linear control characteristic of advantageous contour is thereby associated with adjustment of the potentiometer tap for hue control purposes. When the tap is adjusted for voltage deviation at the range middle, servo loop control of output phase is essentially undisturbed. For initial regions of tap travel in either direction from midrange setting, servo loop opposition to output phase change is sufficiently effective that the hue change per unit of tap travel is slight, with the control thereby serving as only a vernier adjustment of hue. For regions of tap travel more remote from the midrange setting, ever-increasing magnitudes of hue change per unit of tap travel are encountered due to decreasing loop effectiveness, so that a wide range of hue variation may be associated with the adjustment extremes.

Figure 2:
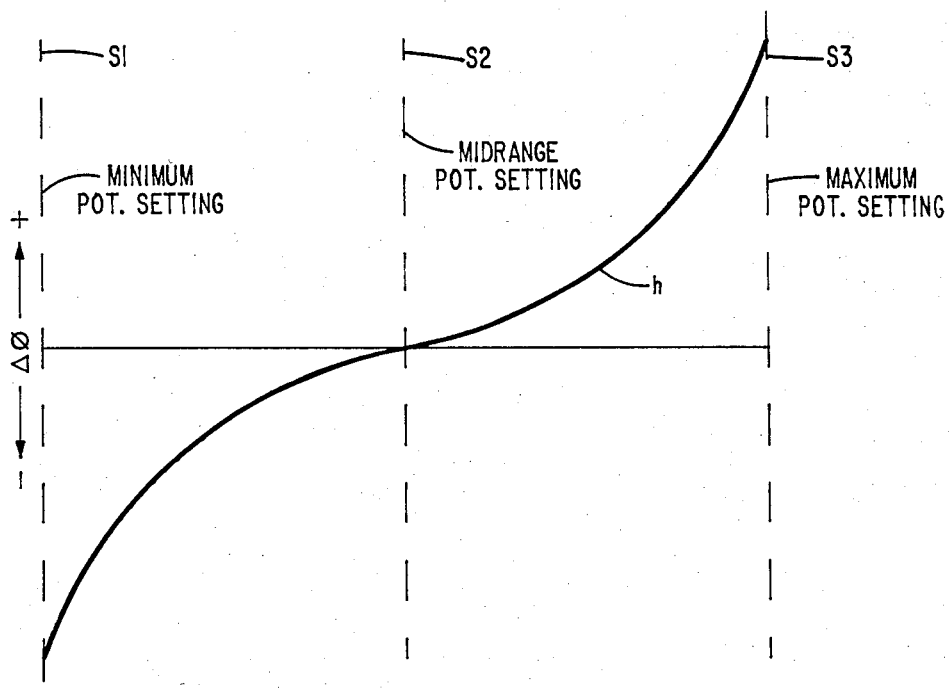

In the accompanying drawings:

FIG. 1 illustrates, partially schematically and partially by block representation, a portion of a color television receiver incorporating an electrical servo system embodying the principles of the present invention; and FIG. 2 illustrates graphically a control characteristic associated with a manually adjustable control element of the FIG. 1 system.

The color television receiver of FIG. 1, which is illustratively of the NTSC type, includes a chrominance signal amplifier 10, the input of which receives (from a chrominance signal input terminal C) the chrominance signal component of received composite color television signals. The chrominance signal component, which comprises modulated color subcarrier waves, is accompanied by color synchronizing information in the form of bursts of subcarrier frequency oscillations recurring at a line rate and timed to occupy a "backporch" portion of recurring horizontal blanking intervals. A burst separator 12, responsive to an output of chrominance signal amplifier 10 and to line rate keying pulses of appropriate "backporch" timing from a burst gating pulse input terminal P, develops separated line rate color synchronizing bursts at a separator output terminal SB.

The illustrated receiver includes a conventional color AFPC loop formed by appropriate couplings between a voltage controlled oscillator (VCO) 16 and an AFPC loop phase detector 14. Detector 14 is responsive to the phase relationship between respective inputs thereto derived from separator output terminal SB and an output terminal CO of the VCO 16, and develops a control voltage output indicative of such relationship at output terminal OC for application to the VCO 16.

VCO 16, which may desirably be of the form shown in the copending U.S. patent application Ser. No. 388,263, of Fang, et al., now issued as U.S. Pat. No. 4,485,353, is provided with an additional output terminal CO', at which appear reference oscillations having a quadrature phase relationship with the reference oscillations supplied to phase detector 14 from terminal CO. For conventional automatic chroma control (ACC) purposes, color synchronizing bursts from terminal SB and reference oscillations from terminal CO' are supplied to an ACC detector 18, which develops a gain control voltage at detector output terminal CC for application to chrominance signal amplifier 10. The applied gain control voltage automatically adjusts the gain of the chrominance signal amplifier 10 in a manner opposing variations in the amplitude of the burst component of the amplifier's output.

The amplified chrominance signal component and accompanying color synchronizing component developed by amplifier 10 is supplied as a signal input to an additional chrominance signal amplifier 20. The gain of amplifier 20 is, illustratively, subject to variation in accordance with a plurality of control inputs supplied thereto from such conventional receiver elements as a color killer, a viewer-operated saturation control, a viewer-operated picture control and an overload detector (such elements not being illustrated to permit drawing simplification). Push-pull versions of the output of chrominance signal amplifier 20 appear at respective output terminals CS and CS'.

Also included in the color television receiver (but not illustrated in FIG. 1) is a color demodulator system for recovering color-difference signals from the received chrominance signal component. The color demodulator system includes an array of color demodulators operating as synchronous detectors of the modulated color subcarrier waves appearing at terminals CS, CS' under the control of appropriately phased color reference oscillations of subcarrier frequency. The reference oscillations to be utilized for such detection purposes are derived from reference oscillation output terminals O, O' of the FIG. 1 arrangement, which includes an automatic hue control system controlling the phase of such reference oscillations in a manner now to be described.

The respective outputs of VCO 16 which appear at terminals CO and CO' are applied to the inputs of respective phase splitters 22 and 24. Push-pull versions of the reference oscillations from terminal CO appear at output terminals BO and BO' of phase splitter 22, which output terminals are connected to the positive terminal ($+V_{cc}$) of an operating potential supply via respective resistors 45 and 47. Resistors 45 and 47 serve as load resistors for a transistor array (30) which effectively functions as a variable phase shifter for the reference oscillations from terminal CO.

Phase shifter 30 includes an NPN transistor 35 serving as a current source for a first pair of NPN transistors (31,33) disposed with interconnected emitter electrodes directly connected to the collector electrode of transistor 35. The base of current source transistor 35 is connected to the positive terminal ($+V_b$) of a bias potential supply, while the emitter electrode thereof is connected via a resistor 37 to the (grounded) negative terminal of the potential supplies.

The base electrodes of transistor 31 and 33 are connected to respective output terminals (RO, RO') of phase splitter 24 so as to respond to oppositely phased versions of the reference oscillations developed at VCO output terminal CO'. The collector electrode of transistor 31 is directly connected to the interconnected emitter electrodes of a second pair of NPN transistors (40,41), while the collector electrode of transistor 33 is directly connected to the interconnected emitter electrodes of a third pair of NPN transistors (42,43).

The collector electrodes of transistor 40 of the second pair and transistor 43 of the third pair are linked, in common, to the $+V_{cc}$ supply terminal by the aforementioned load resistor 47 (and are directly connected to output terminal O'). The collector electrodes of transistor 41 of the second pair and transistor 42 of the third pair are linked, in common, to the $+V_{cc}$ supply terminal by the aforementioned load resistor 45 (and are directly connected to output terminal O). The base electrodes of transistor 40 of the second pair and transistor 42 of the third pair are linked to receive a reference voltage from the positive terminal ($+V_R$) of a reference voltage supply. The base electrodes of transistor 41 of the second pair and transistor 43 of the third pair are linked to receive a control voltage from a control voltage input terminal HC.

The automatic hue control system of FIG. 1 also includes a keyed phase detector 50. Phase detector 50 includes a first pair of NPN detector transistors (51,52) disposed with interconnected emitter electrodes, and with respective base electrodes directly connected to the respective output terminals (CS, CS') of chrominance signal amplifier 20. Current is directly supplied to the interconnected emitter electrodes of transistors 51, 52 from the collector electrode of a current source transistor 53 of NPN type, when transistor 53 is rendered conducting by a burst gating pulse supplied to the base electrode of transistor 53 from the aforementioned burst gating pulse input terminal P. The emitter electrode of transistor 53 is returned to ground via an emitter resistor 54.

The collector electrode of transistor 51 is directly connected to the interconnected emitter electrodes of a second pair of NPN detector transistors (55,56), while the collector electrode of transistor 52 is directly connected to the interconnected emitter electrodes of a third pair of NPN detector transistors (57,58). The output terminal BO of phase splitter 22 is directly connected to the base electrodes of transistors 55 and 57, while the output terminal BO' of phase splitter 22 is directly connected to the base electrodes of transistors 56 and 58.

The collector electrodes of detector transistors 55 and 58 are both directly connected to a detector output terminal D, and to the collector electrode of a PNP transistor 60, disposed with its emitter electrode directly connected to the $+V_{cc}$ supply terminal. The base-emitter path of transistor 60 is shunted by a diode 59, disposed with its anode directly connected to the $+V_{cc}$ supply terminal. The base electrode of transistor 60 is directly connected to the cathode of diode 59 and to the collector electrodes of detector transistors 56 and 57. The output of detector 50 is developed across a filter capacitor 61, coupled between terminal D and ground.

A level shift circuit, including an NPN emitter-follower transistor 65, a resistor 66, a current source transistor 67, and a resistor 68, couples the detector output terminal D to the control voltage input terminal HC of variable phase shifter 30. In the level shift circuit, the emitter-follower transistor 65 is disposed with its base electrode directly connected to terminal D, with its collector electrode directly connected to the $+V_{cc}$ supply terminal, and with its emitter electrode connected via resistor 66 to terminal HC and to the collector electrode of current source transistor 67. The base electrode of current source transistor 67 is connected to the positive terminal $(+V_b')$ of an additional bias potential supply, while the emitter electrode thereof is returned to ground via an emitter resistor 68.

Phase shifter 30, keyed phase detector 50, and the level shift circuit (65-66-67-68) cooperate to form an automatic hue control system of a type described in a copending U.S. patent application (Ser. No. 594,398) of L. Harwood, entitled "Chrominance Processor Control System" and filed Mar. 28, 1984. The system functions to maintain the reference oscillation inputs to phase detector 50 in a predetermined (quadrature) phase relationship with the burst component inputs thereto. In effecting this relationship maintenance, the system tends to reduce hue errors that might otherwise result from the static phase error produced by the AFPC loop 14-16 in those instances when the free-running frequency of VCO 16 differs from the subcarrier frequency of the burst component passed by burst separator 12. The system additionally serves to reduce hue errors that might otherwise result from phase shift variations in chrominance signal amplifier 20 accompanying gain variations induced by application of gain control voltages thereto. Reference may be made to the aforesaid copending Harwood patent application for a more detailed explanation of such error reduction advantages.

In operation of the illustrated automatic hue control system, departures from a quadrature relationship between the respective inputs to phase detector 50 alter the output thereof in a manner unbalancing the potential at terminal HC relative to the reference potential at terminal $V_R$. As a consequence of the unbalance, a phase shift of the reference oscillations developed across load resistors 45, 47 occurs in a departure-opposing sense. The phase shift is a result of the matrixing of a contribution from the output of phase splitter 24, of appropriate magnitude and sense, with a fixed contribution from phase splitter 22.

It will be appreciated that the aforementioned automatic hue control system is an example of an electrical servo system in which electrical signals from a source (VCO 16) are subject to processing (by variable phase shifter 30); the processing means (30) has a control voltage input terminal (HC) and delivers a processed signal output (to terminals O, O') which exhibits a parameter (phase) subject to variation in accordance with the voltage applied to the control voltage input terminal (HC). Means are provided for forming a servo control loop for opposing departures of said parameter (phase) of the processed signal output from a predetermined relationship (quadrature) with a reference parameter (burst component phase). The servo control loop forming means includes: (1) a detector (phase detector 50), responsive to said processed signal output (of phase shifter 30) and to a reference signal (burst component) indicative of said reference parameter (burst component phase), for developing a control voltage (at terminal D) indicative of the magnitude and sense of such departures; and (2) means (level shift circuit 65, 66, etc.) for utilizing said control voltage to alter the voltage at the control voltage input terminal (HC) in a sense tending to reduce the departure.

As previously noted, it is often desired to associate some form of manual override with such a servo system; i.e., to provide a facility permitting a manual adjustment to alter the value of the controllable parameter of the processed signal output from that otherwise maintained by the servo system. In the specific color television receiver example under consideration here, it is desirable to incorporate a manual hue control, permitting the viewer a manual adjustment of the hues of the reproduced color images. Even where the receiver incorporates an automatic hue control system of the advantageous type herein described, it is prudent to additionally provide the viewer with a manual hue control. There are instances of reception of color television signals in which the burst component has been provided with the wrong phase at the source; such an ab initio phase error will not be subject to correction by the automatic hue control system, and requires viewer adjustment of a manual hue control for its correction.

For manual hue control purposes, the arrangement of FIG. 1 employs a hue control potentiometer 63. One fixed end terminal of potentiometer 63 is connected via a range-limiting resistor 62 to the $+V_{cc}$ supply terminal, while the other fixed end terminal of potentiometer 63 is connected via a range-limiting resistor 64 to ground. Desirably, the resistance exhibited by each of the range-limiting resistors (62,64) is small relative to the resistance exhibited between the respective end terminals of potentiometer 63. The adjustable tap of potentiometer 63 is directly connected to the output terminal D of phase detector 50.

As the position of the tap of potentiometer 63 is adjusted, the voltage developed at terminal HC, and hence the phase of the output of phase shifter 30, is altered. The alteration is not linearly related to tap motion, as shown by the control characteristic of FIG. 2, where curve "h" illustrates the magnitude and sense of phase adjustment associated with tap travel in either direction from its midpoint adjustment position. To appreciate the reason for the illustrated contour of the control characteristic, it is necessary to understand the effect of tap adjustment upon the gain of the servo loop. When the tap of potentiometer 63 is at its midpoint adjustment position, the effective load impedance for phase detector 50 is maximum, wherefore the servo loop gain has its maximum magnitude. As the potentiometer tap moves in either direction away from its midpoint position, the phase detector load impedance declines, reducing the loop gain.

For initial regions of tap travel from a midrange setting, servo loop opposition to output phase change is sufficiently effective that the hue change per unit of tap travel is slight, with potentiometer 63 thereby serving to provide only a vernier adjustment of hue. For regions of tap travel more remote from the mid-range setting, ever-increasing magnitudes of hue change per unit of tap travel are encountered due to decreasing loop effectiveness. Accordingly, a wide range of hue variation may be associated with the adjustment extremes.

In the FIG. 1 arrangement, the parameters of the level shift circuit (65-66-67-68) are selected so that the quiescent voltage appearing at the control voltage input terminal HC, when the potentiometer tap is at its midpoint adjustment position, matches the reference potential at terminal $+V_R$. With the potentiometer setting at midpoint, servo loop gain is maximum, and reliance is placed upon the automatic hue control system to control hue in error-reducing fashion. Should, however, signal reception conditions dictate the need for exercise of a manual override, the potentiometer tap is shifted from its midpoint adjustment position to manually introduce a hue change of whatever magnitude and sense is required.

What is claimed is:

1. An electrical servo system including a source of electrical signals, and means for processing said electrical signals, said signal processing means having a control voltage input terminal and providing a processed signal output having a parameter subject to variation in accordance with the voltage applied to said control voltage input terminal; said system comprising:

means forming a servo control loop for opposing departures of said parameter of the processed signal output of said signal processing means from a predetermined relationship with a reference parameter; said servo control loop forming means including detector means, responsive to said processed signal output and to a reference signal indicative of said reference parameter, for developing a control voltage indicative of the magnitude and sense of such departures, and means for utilizing said control voltage to alter the voltage at said control voltage input terminal of said processing means in a sense tending to reduce the departure;

a DC voltage source;

manually adjustable means, coupled to said DC voltage source, for deriving from said DC voltage source a DC voltage of a magnitude adjustable within a predetermined range of magnitudes; and means for rendering the voltage appearing at said control voltage input terminal responsive to the adjustable magnitude of said derived DC voltage while concomitantly rendering the gain of said servo control loop responsive to the adjustment condition of said manually adjustable means.

2. A system in accordance with claim 1, wherein the gain of said servo control loop is rendered responsive to the adjustment condition of said manually adjustable means in such manner that said servo control loop exhibits a gain of maximum magnitude in consonance with the derivation of a DC voltage at the middle of said range by said manually adjustable means, with said loop gain exhibiting a decline from said maximum magnitude for adjustment conditions resulting in a deviation of either sense from said range middle, the degree of said decline depending upon the magnitude of said deviation.

3. A system in accordance with claim 2, for use in a color television receiver, wherein said signal source comprises a color reference oscillator, wherein said signal processing means comprises a variable phase shifter for reference oscillations developed by said oscillator, and wherein said parameter subject to variation is the phase of the reference oscillation output of said variable phase shifter; said manually adjustable means serving as a manual hue control for said color television receiver.

4. A system in accordance with claim 3 wherein said detector means comprises a phase detector having an output terminal; and wherein said manually adjustable means comprises a potentiometer having fixed end terminals across which said DC voltage source is coupled, and having an adjustably positioned tap coupled to said phase detector output terminal in such manner that adjustment of the position of said tap affects the magnitude of the load impedance provided for said phase detector.

* * * * *